//img.com

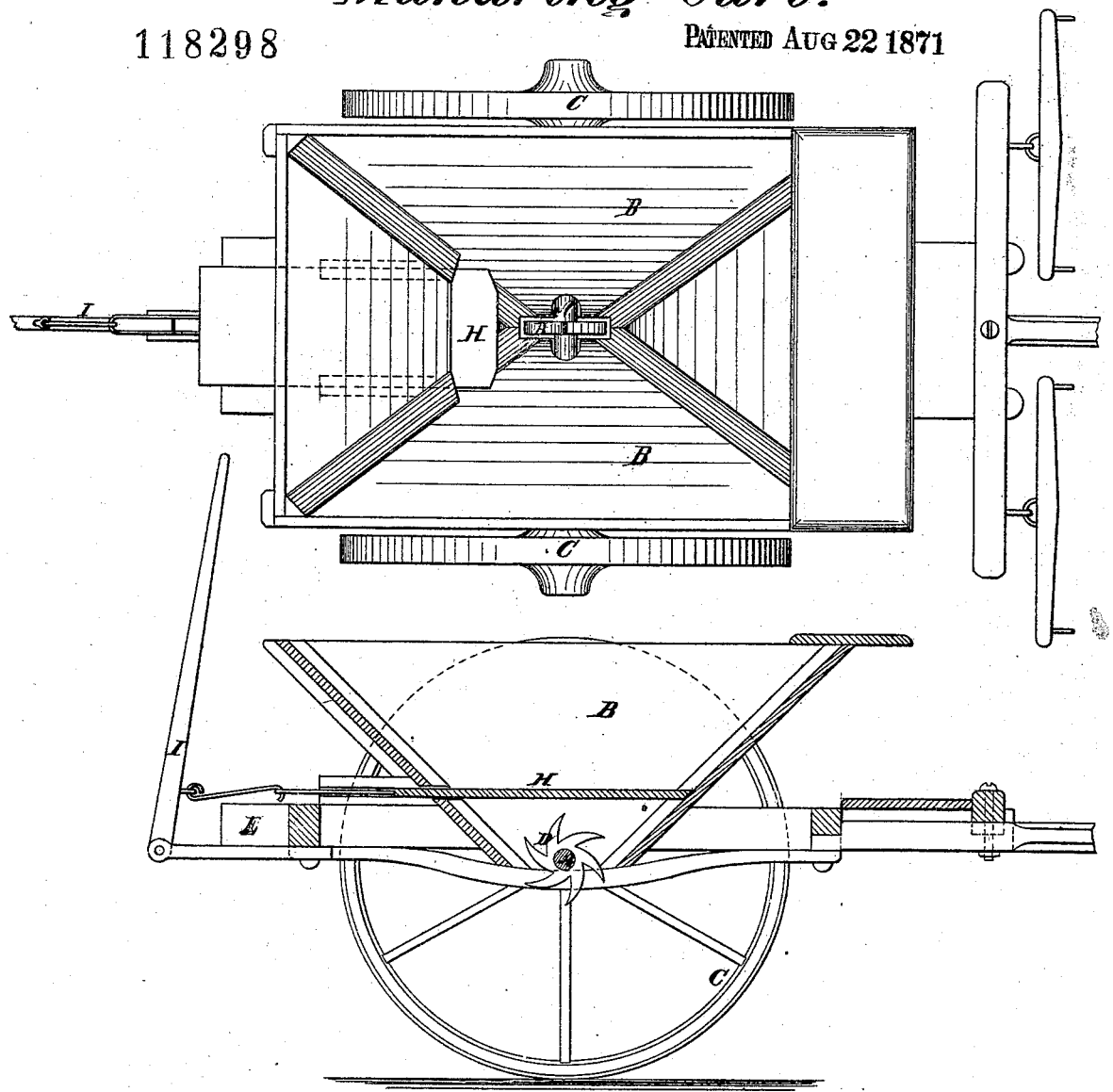

UNITED STATES PATENT OFFICE.

BENJAMIN TEAGUE, OF MOSCOW, TENNESSEE.

IMPROVEMENT IN MANURE-CARTS.

Specification forming part of Letters Patent No. 118,298, dated August 22, 1871.

*To all whom it may concern:*

Be it known that I, BENJAMIN TEAGUE, of Moscow, in the county of Fayette and State of Tennessee, have invented a certain new and useful Improvement in Carts for Manuring Land; and I hereby declare the following to be a full, clear, and exact description of the same, reference being had to the accompanying drawing making part of this specification, in which are shown a plan view of the manuring-cart and a vertical longitudinal section of the same.

This invention relates to an improvement in carts for distributing manure upon land; and consists of a tray-hopper, provided with a sliding door arranged upon a frame secured to an axle mounted on wheels, and provided with a fixed toothed wheel or puller; the whole being arranged in such a manner that, when the manure is placed in the hopper, the cart drawn forward, and the sliding door opened, the manure will fall upon the toothed wheel or puller, which is rotated by the axle being turned by the wheels, and be discharged from the hopper through the discharge-orifice in the bottom of the hopper, thereby distributing the manure effectually over the ground.

In the drawing, B is the hopper; H, the sliding door working therein near the bottom; A, the axle; C, the wheels, secured to the axle so as to cause the axle to revolve with them. D is the toothed wheel or puller, the teeth being curved to catch the manure and pull it from the hopper. This puller D works in a discharge-orifice in the bottom of the hopper B. I is a lever secured to the frame E, and connected in any suitable manner with the sliding door H for operating the same.

When the manure is placed in the hopper B and the cart drawn forward, by opening the sliding door H, by means of the lever I, the manure will fall upon the puller D and by it be drawn through the discharge-orifice in the bottom of the hopper, and be deposited upon the ground immediately beneath the cart.

Having thus described my invention, what I claim as new and useful, and desire to secure by Letters Patent, is—

The wheels C, axle A, puller D, hopper B having sliding door H, and lever I, all arranged relatively one to the other, as and for the purpose hereinbefore set forth.

BENJAMIN TEAGUE.

Witnesses:
M. T. STUART,
A. Q. HARRIS.